(12) United States Patent
Smith

(10) Patent No.: US 10,654,735 B2
(45) Date of Patent: May 19, 2020

(54) METHOD OF COMBINING RECUPERATIVE DIGESTION WITH A CONTACT TANK AND DISSOLVED AIR FLOTATION

(71) Applicant: EVOQUA WATER TECHNOLOGIES LLC, Pittsburgh, PA (US)

(72) Inventor: George W. Smith, Pewaukee, WI (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 0 days.

(21) Appl. No.: 16/309,976

(22) PCT Filed: Jun. 6, 2017

(86) PCT No.: PCT/US2017/036140
§ 371 (c)(1),
(2) Date: Dec. 14, 2018

(87) PCT Pub. No.: WO2017/218239
PCT Pub. Date: Dec. 21, 2017

(65) Prior Publication Data
US 2019/0152820 A1 May 23, 2019

Related U.S. Application Data

(60) Provisional application No. 62/350,938, filed on Jun. 16, 2016.

(51) Int. Cl.
*C02F 9/00* (2006.01)
*C02F 1/24* (2006.01)
(Continued)

(52) U.S. Cl.
CPC ............ *C02F 9/00* (2013.01); *C02F 1/24* (2013.01); *C02F 1/286* (2013.01); *C02F 1/5245* (2013.01);
(Continued)

(58) Field of Classification Search
CPC .. C02F 9/00; C02F 2303/06; C02F 2001/007; C02F 3/121; C02F 11/123; C02F 11/04;
(Continued)

(56) References Cited

U.S. PATENT DOCUMENTS 9,359,239 B2    6/2016  Liu et al.
10,131,550 B2 *  11/2018 Erdogan ............... C02F 3/2813
(Continued)

*Primary Examiner* — Fred Prince

(57) ABSTRACT

A wastewater treatment system includes a contact tank having a first inlet configured to receive wastewater to be treated, a second inlet configured to receive activated sludge, and an outlet, a dissolved air flotation unit having an inlet in fluid communication with the outlet of the contact tank, a biological treatment unit having a first inlet in fluid communication with an effluent outlet of the dissolved air flotation unit and an outlet, an anaerobic digester having an inlet and an outlet, a floated solids conduit providing fluid communication between the solids outlet of the dissolved air flotation unit and the inlet of the anaerobic digester, and a thickener having an inlet in fluid communication with the outlet of the anaerobic digester, a first outlet in fluid communication with the inlet of the anaerobic digester, and a second outlet.

24 Claims, 10 Drawing Sheets

(51) Int. Cl.
  *C02F 3/30* (2006.01)
  *C02F 11/04* (2006.01)
  *C02F 11/12* (2019.01)
  *C02F 3/12* (2006.01)
  *C02F 1/52* (2006.01)
  *C02F 1/28* (2006.01)
  *C02F 11/123* (2019.01)
  *C02F 1/00* (2006.01)

(52) U.S. Cl.
  CPC ............ *C02F 3/121* (2013.01); *C02F 3/1226* (2013.01); *C02F 3/302* (2013.01); *C02F 11/04* (2013.01); *C02F 11/123* (2013.01); *C02F 2001/007* (2013.01); *C02F 2209/44* (2013.01); *C02F 2303/06* (2013.01); *Y02W 10/15* (2015.05)

(58) Field of Classification Search
  CPC ........ C02F 3/302; C02F 1/24; C02F 2209/44; C02F 3/1226; C02F 1/5245; C02F 1/286; Y02W 10/15
  USPC ....... 210/603, 605, 608, 609, 621, 623, 630, 210/252, 259
  See application file for complete search history.

(56) References Cited

U.S. PATENT DOCUMENTS

| | | | |
|---|---|---|---|
| 2002/0192809 A1* | 12/2002 | Lanting | C02F 3/282 435/290.1 |
| 2012/0043277 A1 | 2/2012 | Smith et al. | |
| 2013/0213883 A1* | 8/2013 | Josse | C02F 3/302 210/630 |
| 2016/0221853 A1* | 8/2016 | Cort | C02F 11/121 |

* cited by examiner

METHOD OF COMBINING RECUPERATIVE DIGESTION WITH A CONTACT TANK AND DISSOLVED AIR FLOTATION

BACKGROUND

Aspects and embodiments of the present invention are directed toward systems and methods for the treatment of wastewater.

SUMMARY

In accordance with an aspect of the present invention there is provided a wastewater treatment system. The wastewater treatment system comprises a contact tank having a first inlet configured to receive wastewater to be treated, a second inlet configured to receive activated sludge, and an outlet. The contact tank is configured to mix the wastewater to be treated with the activated sludge to form a first mixed liquor. The system further comprises a dissolved air flotation unit having an inlet in fluid communication with the outlet of the contact tank. The dissolved air flotation unit configured to separate suspended matter from a portion of the first mixed liquor to form a solids-lean dissolved air flotation unit effluent and floated solids, to output the floated solids through a solids outlet of the dissolved air flotation unit, and to output the solids-lean dissolved air flotation unit effluent through an effluent outlet of the dissolved air flotation unit. The system further comprises a biological treatment unit having a first inlet in fluid communication with the effluent outlet of the dissolved air flotation unit and an outlet. The biological treatment unit is configured to biologically break down organic components of the effluent from the dissolved air flotation unit to form a second mixed liquor. The system further comprises a dissolved air flotation unit effluent conduit extending between the effluent outlet of the dissolved air flotation unit and the first inlet of the biological treatment unit, an anaerobic digester having an inlet and an outlet, a floated solids conduit providing fluid communication between the solids outlet of the dissolved air flotation unit and the inlet of the anaerobic digester, and a thickener having an inlet in fluid communication with the outlet of the anaerobic digester, a first outlet in fluid communication with the inlet of the anaerobic digester, and a second outlet. The thickener is configured to receive a portion of a digested solids stream from the outlet of the anaerobic digester, remove liquid from the portion of the digested solids stream to produce a thickened digested solids stream having an increased solids content relative to that of the portion of the digested solids stream, output the removed liquid from the second outlet, and return the thickened digested solids stream to the inlet of the anaerobic digester.

In some embodiments, the thickener is a gravity belt thickener.

The system may be configured to direct a majority of the digested solids stream from the outlet of the anaerobic digester to the inlet of the thickener.

In some embodiments, the thickener is configured to produce the thickened digested solids stream with about twice the solids content of the digested solids stream from the outlet of the anaerobic digester.

In some embodiments, the second outlet of the thickener is in fluid communication with an inlet of the contact tank.

In some embodiments, the second outlet of the thickener is in fluid communication with an inlet of the biological treatment unit.

In some embodiments, the system further comprises a second thickener having an inlet in fluid communication with the outlet of the anaerobic digester downstream of the thickener, the second thickener configured to receive a second portion of the digested solids stream from the outlet of the anaerobic digester and remove liquid from the second portion of the digested solids stream to produce a dewatered digested solids stream having an increased solids content relative to that of the second portion of the digested solids stream. The second thickener may include a liquid outlet in fluid communication with an inlet of the contact tank. The second thickener may include a liquid outlet in fluid communication with an inlet of the biological treatment unit.

In some embodiments, the system further comprises a clarifier having an inlet in fluid communication with the outlet of the biological treatment unit, an effluent outlet, and a return activated sludge outlet. The clarifier is configured to output a clarified effluent through the effluent outlet and a return activated sludge though the return activated sludge outlet.

In some embodiments, the system further comprises a return activated sludge conduit extending between the return activated sludge outlet of the clarifier and a second inlet of the biological treatment unit.

In some embodiments, the system further comprises a primary clarifier having an inlet in fluid communication with a source of wastewater, a solids-lean outlet in fluid communication with the inlet of the contact tank and configured to deliver solids-lean wastewater to be treated to the inlet of the contact tank, and a solids-rich outlet in fluid communication with an inlet of a second thickener and configured to deliver a solids-rich liquid stream separated from the solids-lean wastewater to be treated to the inlet of the second thickener.

In some embodiments, the second thickener includes a solids-rich outlet configured to deliver a thickened solid-rich liquid stream to an inlet of the anaerobic digester and a solids-lean outlet configured to deliver liquid separated from the solid-rich liquid stream to a third inlet of the contact tank.

In accordance with another aspect, there is provided a method of treating wastewater. The method comprises introducing the wastewater into a contact tank including an activated sludge, mixing the wastewater with activated sludge in the contact tank to form a first mixed liquor, directing the first mixed liquor to a dissolved air flotation unit, separating the first mixed liquor in the dissolved air flotation unit to form a solids-lean dissolved air flotation unit effluent and floated solids, directing the solids-lean dissolved air flotation unit effluent to a biological treatment unit, biologically treating the solids-lean dissolved air flotation unit effluent in the biological treatment unit to form a biologically treated mixed liquor, directing the floated solids to an anaerobic digester, biologically treating the floated solids in the anaerobic digester to form digested solids, directing a portion of the digested solids to a thickener, separating liquid from the digested solids in the thickener to form thickened digested solids, and recycling the thickened digested solids to the anaerobic digester.

In some embodiments, the method further comprises directing the liquid separated from the digested solids in the thickener to the contact tank.

In some embodiments, the method further comprises directing the liquid separated from the digested solids in the thickener to the biological treatment unit.

In some embodiments, directing the portion of the digested solids to the thickener comprises directing a majority of the digested solids formed in the anaerobic digester to the thickener.

In some embodiments, separating liquid from the digested solids in the thickener comprises increasing a solids content of the digested solids by about two times in the thickener to form the thickened digested solids.

In some embodiments, the method further comprises directing a second portion of the digested solids to a second thickener in fluid communication downstream of the anaerobic digester and thickener.

In some embodiments, the method further comprises dewatering the second portion of the digested solids in the second thickener. The method may further comprise directing liquid separated from the second portion of the digested solids in the second thickener to the contact tank. The method may further comprise directing liquid separated from the second portion of the digested solids in the second thickener to the biological treatment unit.

In some embodiments, the method further comprises directing the biologically treated mixed liquor to a clarifier, separating the biologically treated mixed liquor in the clarifier to form a clarified effluent and a return activated sludge, recycling a portion of the return activated sludge to the biological treatment unit, and directing the clarified effluent to a treated wastewater outlet.

In accordance with another aspect, there is provided a method of facilitating increased operating efficiency of a wastewater treatment system including a contact tank, a dissolved air flotation unit having an inlet in fluid communication with an outlet of the contact tank, a biological treatment unit in fluid connection with an outlet of the contact tank, and an anaerobic digester including an inlet in fluid communication with a floated solids outlet of the dissolver air flotation unit. The method comprises connecting an inlet of a thickener to an outlet of the anaerobic digester and connecting a thickened digested solids outlet of the thickener to the inlet of the anaerobic digester.

In some embodiments, the method further comprises connecting a liquids outlet of the thickener to one of the contact tank and the biological treatment unit.

In some embodiments, the method further comprises fluidly connecting a second thickener to the outlet of the anaerobic digester downstream of the thickener.

In some embodiments, the method further comprises connecting a liquids outlet of the second thickener to one of the contact tank and the biological treatment unit.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
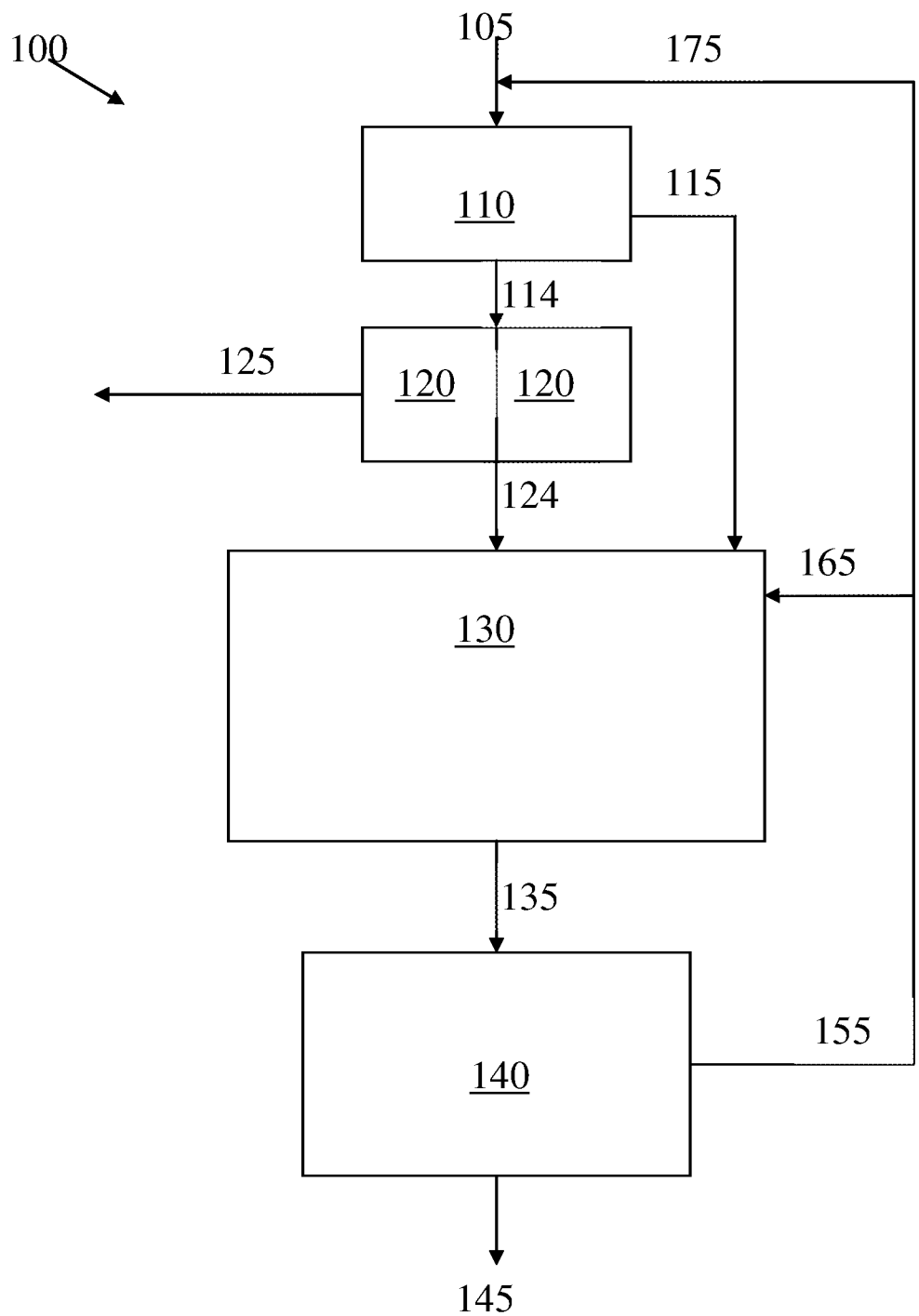
FIG. 1 is a block flow diagram of a wastewater treatment system in accordance with an embodiment of the present invention.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

As the term is used herein, an "upstream" unit operation refers to a first unit operation which is performed upon a fluid undergoing treatment prior to a second unit operation. Similarly, an "upstream" treatment vessel or portion thereof refers to a first treatment vessel or portion thereof in which a first unit operation is performed prior to a second unit operation performed in a second treatment vessel or portion thereof. A "downstream" unit operation refers to a second unit operation which is performed upon a fluid undergoing treatment subsequent to a first unit operation. Similarly, a "downstream" treatment vessel or portion thereof refers to a second treatment vessel or portion thereof in which a second unit operation is performed subsequent to a first unit operation performed in a first treatment vessel or portion thereof. An upstream unit operation and/or treatment vessel having an outlet in "direct fluid communication" with an inlet of a downstream unit operation and/or treatment vessel directs material output from the outlet of the upstream unit operation and/or treatment vessel into the inlet of the downstream unit operation and/or treatment vessel without any intervening operations performed on the material. A first unit operation and/or treatment vessel described herein as being in fluid communication with a second unit operation and/or treatment vessel should be understood as being in direct fluid communication with the second unit operation and/or treatment vessel unless explicitly described as otherwise. Conduits which provide fluid communication between a first and a second unit operation and/or treatment vessel are to be understood as providing direct fluid communication between the first and second unit operation and/or treatment vessel unless explicitly described as otherwise.

Various unit operations and/or treatment vessels disclosed herein separate fluid and/or sludge into a solids-rich portion and a solids-lean portion wherein the solid-lean portion has a lower concentration of solids than the solids-rich portion. As the term is used herein, an "effluent" of a unit operation and/or treatment vessel refers to the solids-lean portion of the separated fluid and/or sludge. "Recycle" of material refers to directing material from an outlet of a downstream unit operation and/or treatment vessel to an inlet of a unit operation and/or treatment vessel upstream of the downstream unit operation and/or treatment vessel.

Co-owned U.S. Pat. No. 8,808,544, titled "CONTACT STABILIZATION/PRIME FLOAT HYBRID" and co-pending U.S. patent application Ser. No. 15/056,348, titled "ENHANCED BIOSORPTION OF WASTEWATER ORGANICS USING DISSOLVED AIR FLOTATION WITH SOLIDS RECYCLE" are incorporated herein by reference in their entireties for all purposes.

Aspects and embodiments of the present invention are directed toward systems and methods for treating wastewater. As used herein the term "wastewater" includes, for example, municipal wastewater, industrial wastewater, agricultural wastewater, and any other form of liquid to be treated containing undesired contaminants. Aspects and embodiments of the present invention may be utilized for primary wastewater treatment, secondary wastewater treatment, or both. Aspects and embodiments of the present invention may remove sufficient contaminants from wastewater to produce product water that may be used for, for example, irrigation water, potable water, cooling water, boiler tank water, or for other purposes.

In some embodiments, the apparatus and methods disclosed herein provide advantages with regard to, for example, capital costs, operational costs, and environmental-friendliness as compared to conventional biological wastewater treatment systems. In some embodiments a dissolved air flotation system is included in a main stream of wastewater entering a biological wastewater treatment system. The dissolved air floatation system may remove a significant amount of biological oxygen demand, for example, particulate biological oxygen demand, from wastewater prior to the wastewater entering the biological treatment portion of the wastewater treatment system. This provides for a reduction in the size of the biological treatment portion of the wastewater treatment system for a given wastewater stream as compared to a conventional wastewater treatment system and a commensurate reduced capital cost for the overall system. Utilization of the dissolved air flotation system also reduces the requirement for aeration in the biological treatment portion of the treatment system to effect oxidation of the biological oxygen demand of the wastewater, reducing operating costs. The amount of waste sludge generated by the biological treatment portion of the treatment system is also reduced, reducing the amount of waste which would need to be disposed of or otherwise further treated. The material removed from the wastewater in the dissolved air flotation system may be utilized to produce energy, for example, in the form of biogas in a downstream anaerobic digestion system. The biogas may be used to provide salable energy through combustion or through use in, for example, fuel cells.

A first embodiment, indicated generally at 100, is illustrated in FIG. 1. Wastewater from a source of wastewater 105 is directed into a contact tank 110 through an inlet of the contact tank. In the contact tank 110, the wastewater is mixed with activated sludge recycled through a conduit 175 from a downstream biological treatment process described below. In some embodiments, the contact tank 110 is aerated to facilitate mixing of the wastewater and the activated sludge. The aeration gas may be an oxygen containing gas, for example, air. The contact tank 110 may be provided with sufficient oxygen such that aerobic conditions are maintained in at least a portion of the contact tank 110. For example, the contact tank 110 may be aerated. Suspended and dissolved solids in the wastewater, including oxidizable biological materials (referred to herein as Biological Oxygen Demand, or BOD), are absorbed into the activated sludge in the contact tank, forming a first mixed liquor. A portion of the BOD may also be oxidized in the contact tank 110. The residence time of the wastewater in the contact tank may be sufficient for the majority of the BOD to be absorbed by the activated sludge, but no so long as for a significant amount of oxidation of the BOD to occur. In some embodiments, for example, less than about 10% of the BOD entering the contact tank 110 is oxidized in the contact tank. The residence time of the wastewater in the contact tank is in some embodiments from about 30 minutes to about two hours, and in some embodiments, from about 45 minutes to about one hour. The residence time may be adjusted depending upon factors such as the BOD of the influent wastewater. A wastewater with a higher BOD may require longer treatment in the contact tank 110 than wastewater with a lower BOD.

A first portion of the first mixed liquor formed in the contact tank is directed into a dissolved air flotation (DAF) system 120 through conduit 114. The DAF system may include a vessel, tank, or other open or closed containment unit configured to perform a dissolved air flotation operation as described below. For the sake of simplicity a dissolved air flotation system will be referred to herein as a "DAF unit." The DAF unit 120 may function as both a thickener and a clarifier. FIG. 1 illustrates two DAF units 120 operating in parallel, however, other embodiments may have a single DAF unit or more than two DAF units. Providing multiple DAF units provides for the system to continue operation if one of the DAF units is taken out of service for cleaning or maintenance.

Before entering the DAF unit(s), air or another gas may be dissolved in the first mixed liquor under pressure. The pressure may be released as the first mixed liquor enters the DAF unit(s) 120, resulting in the gas coming out of solution and creating bubbles in the mixed liquor. In some embodiments, instead of dissolving gas into the first mixed liquor, a fluid, for example, water having a gas, for example, air, dissolved therein, is introduced into the DAF unit(s) 120 with the first mixed liquor. Upon the mixing of the first mixed liquor and the gas-containing fluid, bubbles are produced. The bubbles formed in the DAF unit(s) 120 adhere to suspended matter in the first mixed liquor, causing the suspended matter to float to the surface of the liquid in the DAF unit(s) 120, where it may be removed by, for example, a skimmer.

In some embodiments, the first mixed liquor is dosed with a coagulant, for example, ferric chloride or aluminum sulfate prior to or after introduction into the DAF unit(s) 120. The coagulant facilitates flocculation of suspended matter in the first mixed liquor.

In the DAF unit(s) 120 at least a portion of the solids present in the influent first mixed liquor, including solids from the influent wastewater and from the recycled activated sludge, are removed by a dissolved air flotation process. At least a portion of any oil that may be present in the first mixed liquor may also be removed in the DAF unit(s) 120. In some embodiments, a majority, for example, about 60% or more, about 75% or more, or about 90% or more of the suspended solids in the first mixed liquor introduced into the DAF unit(s) 120 is removed and about 40% or more, for example, about 50% or more or about 75% or more of the BOD is removed. Removal of the BOD may include enmeshment and adsorption in the first mixed liquor and/or oxidation of the BOD and the formation of reaction products such as carbon dioxide and water. In other embodiments, up to about 100% of the suspended solids is removed in the DAF unit(s) 120 and a majority, for example, up to about 80% of the BOD is removed.

In some embodiments, suspended solids removed in the DAF unit(s) 120 are sent out of the system as waste solids through a conduit 125. These waste solids may be disposed of, or in some embodiments, may be treated in a downstream process, for example, an anaerobic digestion process or anaerobic membrane bioreactor to produce useful products, for example, biogas and/or usable product water.

In other embodiments, at least a portion of the suspended solids removed in the DAF unit(s) 120 are recycled back to the contact tank 110 through conduits 125 and 126. Conduit 126 may branch off of conduit 125 as illustrated, or may be connected to a third outlet of the DAF unit(s) 120, in which case suspended solids removed in the DAF unit(s) 120 are recycled back to the contact tank 110 through conduit 126 only. The amount of solids recycled from DAF unit(s) 120 to the contact tank 110 may range from about 1% to about 100% of a total amount of solids removed from the first mixed liquor in the DAF unit(s) 120. The amount of solids recycled from DAF unit(s) 120 to the contact tank 110 may be a majority of a total amount of solids removed from the first mixed liquor in the DAF unit(s) 120, for example, greater than about 50%, between about 50% and about 95%, or between about 60% and about 80% of the total amount of solids removed from the first mixed liquor in the DAF unit(s) 120.

Recycling solids removed in the DAF unit(s) 120 to the contact tank 110 is counter to the conventional operation of wastewater treatment systems including DAF units. Typically, DAF units are utilized in wastewater treatment systems to remove solids from the wastewater, thus reducing the need for biological treatment of these removed solids and reducing the energy requirements of the wastewater treatment system by, for example, reducing the amount of air needed to be supplied to an aerated biological treatment vessel to oxidize the removed solids. It is counter to conventional operation of wastewater treatment systems to re-introduce floated solids separated from mixed liquor from a contact tank in DAF unit(s) back to the contact tank. Typically, after solids are separated from mixed liquor from a contact tank in DAF unit(s), reintroducing the separated solids into mixed liquor in the contact tank and force the solids to go through the same separation process in the DAF unit(s) again reducing the efficiency of the system. Such a solids recycle from DAF unit(s) to a contact tank directly upstream of the DAF unit(s) would cause a need for a greater amount of contact tank capacity and a greater amount of DAF unit capacity. Such a solids recycle from DAF unit(s) to a contact tank directly upstream of the DAF unit(s) would also require more air flow to the DAF unit(s) to remove the recycled solids from the mixed liquor in addition to any solids that would be present in the absence of the solids recycle. It has been discovered, however, that benefits may be achieved by the counterintuitive re-introduction of solids removed in DAF unit(s) back into the contact tank of a wastewater treatment system from which mixed liquor is supplied to the DAF unit(s).

For example, by recycling the solids removed by the DAF unit(s) 120 to the contact tank 110, the amount of total suspended solids (TSS) in the contact tank 110 may be increased as compared to methods not including a recycle of solids from the DAF unit(s) 120 to the contact tank 110. The increased TSS level in the contact tank 110 may provide for additional soluble BOD to be adsorbed in the contact tank 110 as compared to a contact tank 110 having a lower level of TSS. In some embodiments, a desirable TSS level in the contact tank 110 may be between about 1,200 mg/L and about 3,500 mg/L.

The removal of the additional soluble BOD in the contact tank 110 due to the higher TSS level in the contact tank 110, resulting from the recycle of solids from the DAF unit(s) 120 to the contact tank 110, provides for the removal of this additional BOD as solids in the DAF unit(s) 120. The additional BOD removed as solids in the DAF unit(s) 120 may be directed to an anaerobic digester (for example, anaerobic digester 490 illustrated in FIG. 4) rather than an aerated biological treatment unit (for example, biological treatment unit 130), thus reducing the need for aeration power in the biological treatment unit and increasing the amount of biogas that could be produced in the anaerobic digester.

When supplied with recycled solids from the DAF unit(s) 120, the contact tank 110 may have a hydraulic retention time (HRT) of between about 15 minutes and about one hour and a solids retention time (SRT) of between about 0.5 days and about two days to effectively adsorb soluble BOD. In other embodiments, the SRT in the contact tank may be between about 0.2 and about 0.4 days. When the contact tank 110 includes TSS in a range of between about 1,200 mg/L and about 3,500 mg/L, a sludge age (SRT) in the contact tank may range from about one to about two days.

Recycling solids removed in the DAF unit(s) 120 to the contact tank 110 provides for the contact tank 110 to function as a high rate activated sludge system while the DAF unit(s) 120 function a solids-liquid separator. Recycling solids removed in the DAF unit(s) 120 to the contact tank 110 provides for greater oxidation of BOD in the contact tank 110 than in systems where solids removed from the DAF unit(s) 120 are not recycled to the contact tank because the solids recycled to the contact tank includes living bacteria capable of oxidizing BOD. For example, in systems and methods where solids removed in the DAF unit(s) 120 are recycled to the contact tank 110, oxidation of greater than about 10% of the BOD in wastewater influent to the contact tank 110 may be oxidized in the contact tank 110. Recycling solids removed in the DAF unit(s) 120 to the contact tank 110 may thus reduce the amount of BOD that needs to be treated in downstream unit operations, for example, in the biological treatment unit 130 discussed below, thus reducing the power requirements for the downstream unit operations. The SRT of the contact tank 110 may be adjusted to optimize BOD removal of particulate, colloidal, and soluble BOD fractions.

Effluent from the DAF unit(s) 120 is directed through conduit 124 into the biological treatment unit 130, which may include one or more treatment tanks. In some embodiments, the biological treatment unit 130 may comprise a contact stabilization vessel. A portion of the effluent may be recycled (recycle system not shown in FIG. 1) to supply gas bubbles to the DAF unit(s) 120. A gas may be dissolved into the recycled portion of effluent, which is then directed back into the DAF unit(s) 120 and mixed with influent first mixed liquor.

A second portion of the first mixed liquor formed in the contact tank is directed into the biological treatment unit 130 through a conduit 115. In some embodiments, about a half of the first mixed liquor formed in the contact tank is directed into the DAF unit(s) 120 and about a half of the first mixed liquor formed in the contact tank is directed through the conduit 115 into the biological treatment unit 130. In other embodiments, between about one third and two thirds of the first mixed liquor formed in the contact tank is directed into the DAF unit(s) 120 and the remainder of the first mixed liquor formed in the contact tank is directed through the conduit 115 into the biological treatment unit 130. The amount of the first mixed liquor directed into the DAF unit(s) 120 as opposed to the biological treatment unit 130 may be varied based upon such factors as the concentration of the first mixed liquor and the effectiveness of the first mixed liquor at enmeshing BOD in the contact tank 110.

For example, if it was desired to remove a greater rather than a lesser amount of solids in the DAF unit(s) 120, a greater fraction of the first mixed liquor from the contact tank would be directed to the DAF unit(s) 120 when the first mixed liquor had a lower rather than a higher concentration of solids. Similarly, if it was desired to remove a greater rather than a lesser amount of BOD in the DAF unit(s) 120, a greater fraction of the first mixed liquor from the contact tank would be directed to the DAF unit(s) 120 when the first mixed liquor had a lesser rather than a greater effectiveness at enmeshing BOD in the contact tank.

In the biological treatment unit 130, the effluent from the DAF unit(s) 120 and the first mixed liquor formed in the contact tank 110 are combined to form a second mixed liquor which is biologically treated. In some embodiments, biological treatment of the second mixed liquor in the biological treatment unit 130 includes oxidation of BOD in the second mixed liquor. To this end, oxygen may be supplied to the second mixed liquor in the biological treatment unit 130 by aeration with an oxygen containing gas, for example, air. In some embodiments, the biological treatment unit 130 is supplied with sufficient oxygen for aerobic conditions to be created in the biological treatment unit 130. In other embodiments, the amount of oxygen supplied is insufficient to meet the entire oxygen demand of the second mixed liquor, and the biological treatment unit 130, or at least a portion thereof, may be maintained in an anoxic or anaerobic condition. Nitrification and denitrification of the second mixed liquor may occur in different portions of the aerated biological treatment unit 130. The residence time of the second mixed liquor in the biological treatment unit 130 may be sufficient to oxidize substantially all BOD in the second mixed liquor. Residence time for the second mixed liquid in the biological treatment unit 130 may be from about three to about eight hours. This residence time may be increased if the influent wastewater to be treated and/or the second mixed liquor contains a high level of BOD or decreased if the influent wastewater to be treated and/or the second mixed liquor includes a low level of BOD.

Biologically treated mixed liquor from the biological treatment unit 130 is directed through a conduit 135 into a separation apparatus, which may include, for example, a clarifier 140, a gravity separation apparatus, and/or another form of separation apparatus. Effluent from the clarifier 140 may be directed to a product water outlet through a conduit 145 or be sent on for further treatment. Activated sludge separated from effluent in the clarifier may be recycled back upstream to a wastewater inlet of the system, the source of wastewater, the contact tank 110 through conduits 155 and 175, and/or the biological treatment unit 130 through conduits 155 and 165. In some embodiments 100% of the activated sludge separated in the clarifier is recycled upstream. In some embodiments between about 10% and about 20% of the recycled sludge is directed to the wastewater inlet and contact tank through the conduit 175 and between about 80% and 90% of the recycled sludge is directed into the biological treatment unit 130 through the conduit 165. The amount of recycled sludge directed to the wastewater inlet and contact tank through the conduit 175 may be set at a higher end of this range when the incoming wastewater has a high level of BOD and/or when the recycled sludge is less rather than more effective at enmeshing BOD in the contact tank 110. The amount of recycled sludge directed to the wastewater inlet and contact tank through the conduit 175 may be set at a lower end of this range when the incoming wastewater has a low level of BOD and/or when the recycled sludge is more rather than less effective at enmeshing BOD in the contact tank 110.

The amount of activated sludge separated in the clarifier 140 which is recycled to the contact tank 110 and/or biological treatment unit 130 may also be adjusted based on a fraction of the first mixed liquor from the contact tank 110 which is directed to the DAF unit(s) 120, the amount of activated sludge which is removed in the DAF units(s) 120, and/or the amount of activated sludge removed in the DAF units(s) 120 which is recycled to the contact tank 110. The amount of activated sludge which is recycled to the contact tank 110 and/or biological treatment unit 130 may be an amount equal to or greater than an amount required to maintain a desired population of bacteria in the biological treatment unit 130 to perform biological treatment of the second mixed liquor within a desired timeframe and/or to protect against depletion of the bacterial population in the event of temporary disruptions in the operation of the treatment system. For example, the amounts of activated sludge which is recycled to the contact tank 110 or biological treatment unit 130 may be set such that sufficient bacteria containing solids are present in the biological treatment unit 130 to result in a SRT of between about one and about 10 days in the biological treatment unit 130. Similarly, an amount or fraction of the first mixed liquor directed into the DAF unit(s) 120 may be adjusted based on the amount of activated sludge recycled from the clarifier 140, the efficiency of removal of solids in the DAF unit(s) 120 and/or the concentration of one or more types of bacteria in the biological treatment unit 130 to, for example, establish or maintain a desired population of bacteria in the biological treatment unit 130.

In the embodiment illustrated in FIG. 1, and in the additional embodiments described below, it should be understood that the various conduits illustrated may be provided with, for example, pumps, valves, sensors, and control systems as needed to control the flow of fluids therethrough. These control elements are not illustrated in the figures for the sake of simplicity.

Figure 2:
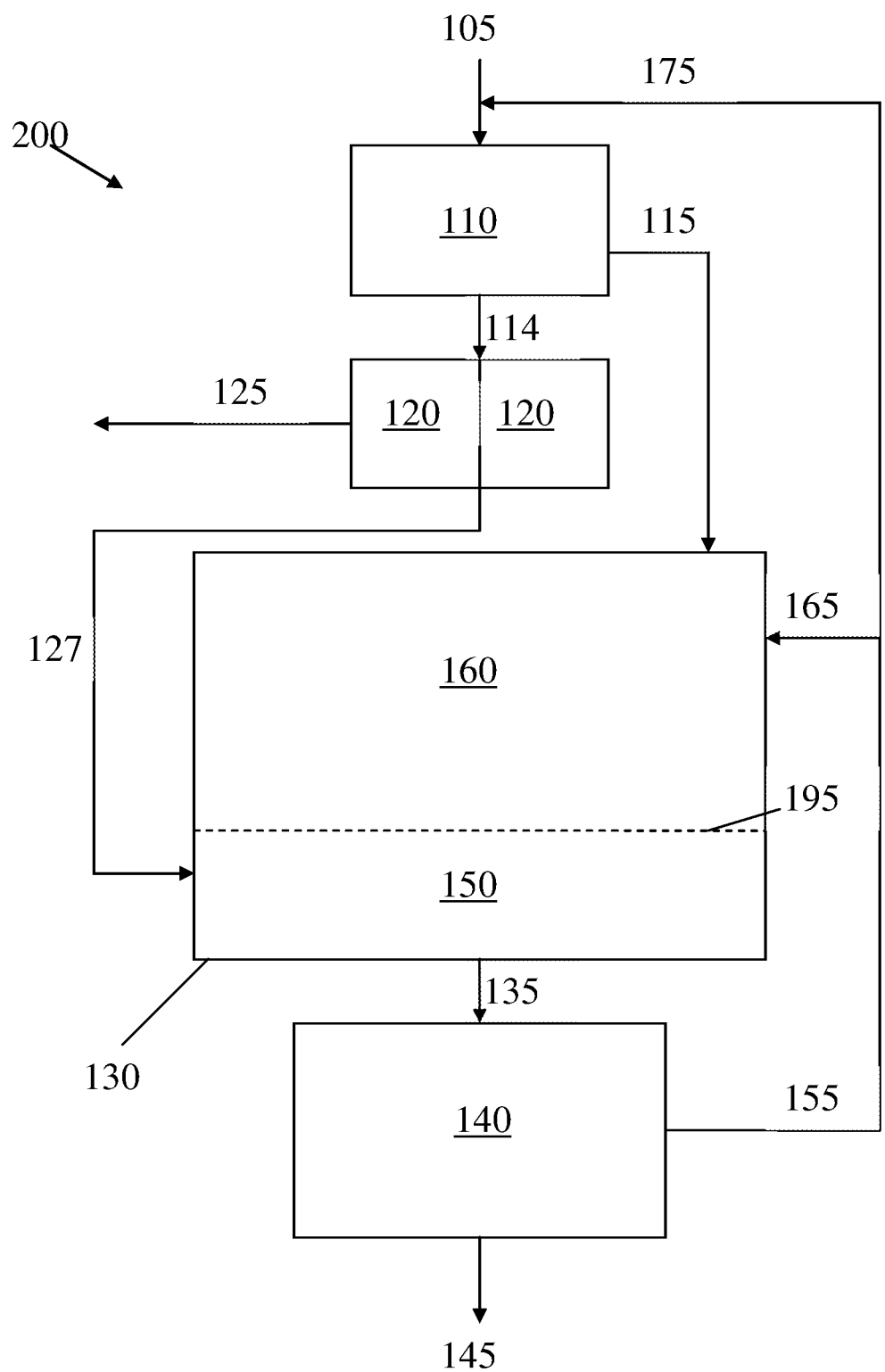
FIG. 2 is a block flow diagram of a wastewater treatment system in accordance with another embodiment of the present invention.

In another embodiment, indicated generally at 200 in FIG. 2, the biological treatment unit 130 includes an aerobic region 150 and an aerated anoxic region 160. The aerobic region 150 is in fluid communication downstream of the aerated anoxic region 160 and receives biologically treated anoxic mixed liquor from the aerated anoxic region. In some embodiments, the aerobic region 150 may be formed in a same vessel or tank as the aerated anoxic region 160 and separated therefrom by a partition or weir 195. In other embodiments, the aerobic region 150 may be physically separate from the aerated anoxic region 160. For example, the aerobic region 150 and the aerated anoxic region 160 may occupy distinct vessels or tanks or may be otherwise separated from one another. In further embodiments the contact tank 110 may be combined with the aerated anoxic region 160 in the same tank.

In the system of FIG. 2 effluent from the DAF unit(s) 120 is directed into the aerobic region 150 without first passing through the aerated anoxic region 160. In other embodiments, the effluent from the DAF unit(s) 120 may be introduced into the aerated anoxic region 160 and then directed into the aerobic region 150.

Figure 3:
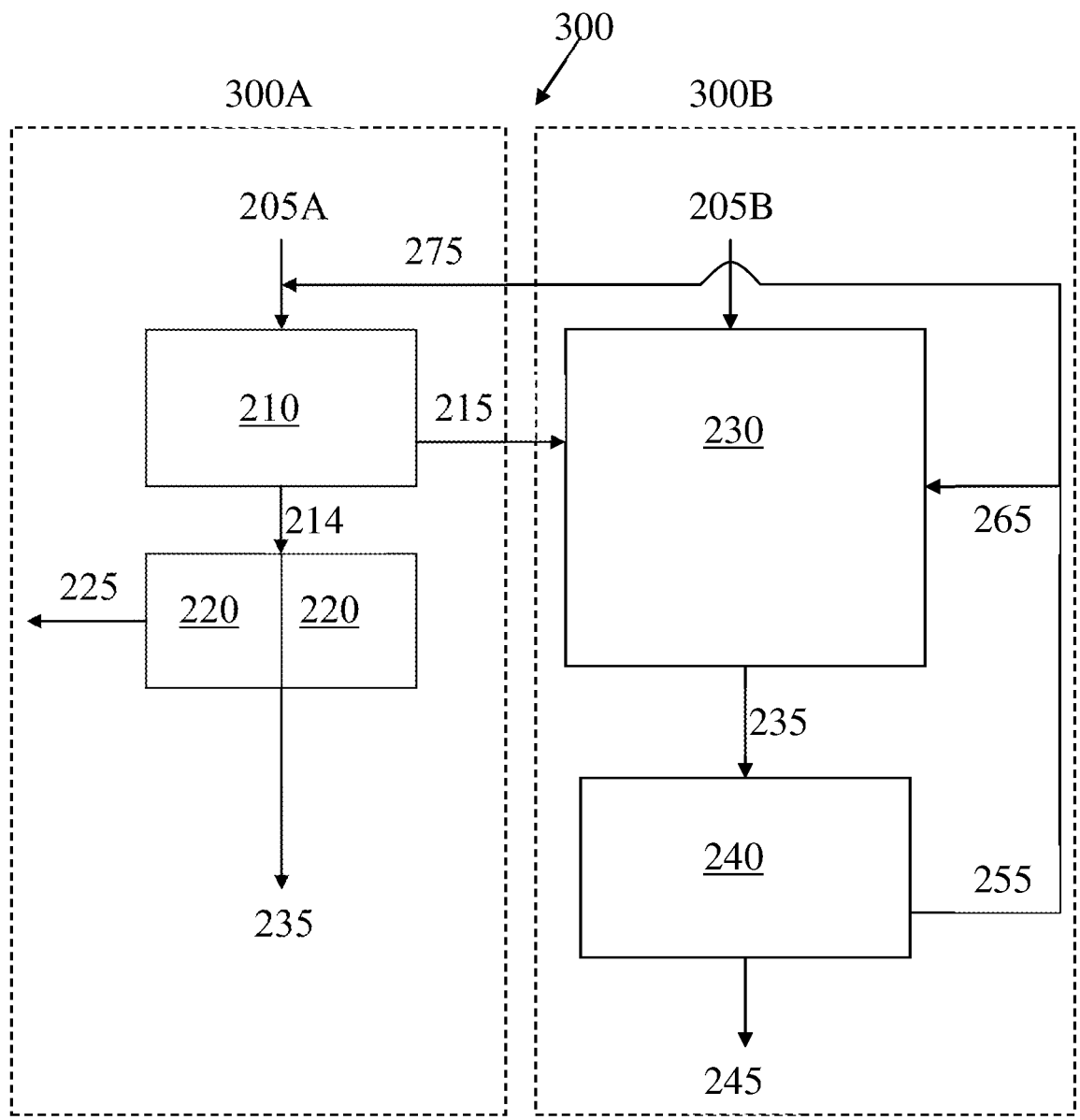
FIG. 3 is a block flow diagram of a wastewater treatment system in accordance with another embodiment of the present invention.

Another embodiment, indicated generally at 300, is illustrated in FIG. 3. In this embodiment, the wastewater treatment system 300 is broken into two separate but interconnected subsystems, one subsystem 300A including a contact tank 210 and DAF unit(s) 220, and a second subsystem 300B including a biological treatment unit 230 and a separation apparatus 240. In the first subsystem 300A influent wastewater from a source of wastewater 205A is directed into the contact tank 210. In the contact tank, the wastewater is mixed with activated sludge recycled through a conduit 275 from a biological treatment process included in subsystem 300B described below. In some embodiments, the contact tank 210 is aerated to facilitate mixing of the wastewater and the activated sludge. Suspended and dissolved solids in the wastewater are adsorbed/absorbed into the activated sludge in the contact tank 210, forming a first mixed liquor. A portion of the BOD in the influent wastewater may be oxidized in the contact tank 210. The residence time of the wastewater in the contact tank may be sufficient for the majority of the BOD to be adsorbed/absorbed by the activated sludge, but no so long as for a significant amount of oxidation of the BOD to occur. In some embodiments, for example, less than about 10% of the BOD entering the contact tank 210 is oxidized in the contact tank. The residence time of the wastewater in the contact tank is in some embodiments from about 30 minutes to about two hours, and in some embodiments, from about 45 minutes to about one hour. The residence time may be adjusted depending upon factors such as the BOD of the influent wastewater. A wastewater with a higher BOD may require longer treatment in the contact tank 210 than wastewater with a lower BOD.

A first portion of the first mixed liquor formed in the contact tank is directed into a DAF unit 220 through conduit 214. FIG. 3 illustrated two DAF units 220 operating in parallel, however other embodiments may have a single DAF unit or more than two DAF units. Providing multiple DAF units provides for the system to continue operation if one of the DAF units is taken out of service for cleaning or maintenance. A second portion of the first mixed liquor formed in the contact tank is directed into the biological treatment unit 230 in the second subsystem 300B through a conduit 215. In some embodiments, about a half of the first mixed liquor formed in the contact tank is directed into the DAF unit(s) 220 and about a half of the first mixed liquor formed in the contact tank is directed through the conduit 215 into the biological treatment unit 230. In other embodiments, between about one third and two thirds of the first mixed liquor formed in the contact tank is directed into the DAF unit(s) 220 and the remainder of the first mixed liquor formed in the contact tank is directed through the conduit 215 into the biological treatment unit 230. The amount of the first mixed liquor directed into the DAF unit(s) 220 as opposed to the biological treatment unit 230 may be varied based upon such factors as the concentration of the first mixed liquor and the effectiveness of the first mixed liquor at enmeshing BOD in the contact tank 210.

In the DAF unit(s) 220 at least a portion of the solids present in the influent first mixed liquor, including solids from the influent wastewater and from the recycled activated sludge, are removed by a dissolved air flotation process such as that described above with reference to DAF unit(s) 120. The removed suspended solids may be sent out of the system as waste solids through a waste conduit 225. These waste solids may be disposed of or treated in a downstream process, for example, an anaerobic digestion process or anaerobic membrane bioreactor to produce biogas and/or usable product water. Effluent from the DAF unit(s) 220 is directed to an outlet 235 from which it may be used as product water or sent on for further treatment.

In some embodiments, a portion of the suspended solids removed from the first mixed liquor in the DAF unit(s) 220 may be recycled to the contact tank 210 through conduits 225 and 226 in a similar manner as the recycle of suspended solids removed in the DAF unit(s) 120 to the contact tank 110 described above with reference to FIG. 1.

In the second subsystem 300B, influent wastewater from a source of wastewater 205B is introduced into the biological treatment unit 230. The source of wastewater 205B may be the same as or different from the source of wastewater 205A. In the biological treatment unit 230 the wastewater and the first mixed liquor formed in the contact tank 210 are combined to form a second mixed liquor which is biologically treated. In some embodiments, biological treatment of the second mixed liquor in the biological treatment unit 230 may include oxidation of BOD in the second mixed liquor. To this end, oxygen may be supplied to the second mixed liquor in the biological treatment unit 230 by aeration with an oxygen containing gas, for example, air. In some embodiments, the biological treatment unit 230 is supplied with sufficient oxygen for aerobic conditions to be created in the biological treatment unit 230. In other embodiments, the amount of oxygen supplied is insufficient to meet the entire oxygen demand of the second mixed liquor and the biological treatment unit 230, or at least a portion thereof, may be maintained in an anoxic or anaerobic condition. Nitrification and denitrification of the second mixed liquor may occur in different portions of the aerated biological treatment unit 230.

Residence time for the second mixed liquid in the biological treatment tank 230 may be from about three to about eight hours. This residence time may be increased if the influent wastewater to be treated and/or the second mixed liquor contains a high level of BOD or decreased if the wastewater and/or the second mixed liquor includes a low level of BOD.

Biologically treated mixed liquor from the biological treatment unit 230 is directed through a conduit 235 into a separation apparatus, which may include, for example, a clarifier 240. Effluent from the clarifier 240 may be directed to a product water outlet through a conduit 245 or be sent on for further treatment. Activated sludge separated from effluent in the clarifier may be recycled back upstream to the biological treatment unit 230 and/or to the contact tank 210 in subsystem 300A through a conduit 255. In some embodiments about 100% of the activated sludge separated in the clarifier is recycled upstream. In some embodiments from about 10% to about 20% of the recycled sludge is directed to the wastewater inlet and contact tank through a conduit 275 and from about 80% to about 90% of the recycled sludge is directed into the biological treatment unit 230 through a conduit 265.

Utilizing DAF units as described above in a wastewater treatment system provides several advantages over similar wastewater treatment systems operated without DAF units. Because the DAF units remove a significant portion of suspended solids from influent wastewater without the need for oxidation of these solids, the size of other components of the system may be reduced, resulting in a lower capital cost for the system. For example, primary clarifiers may be omitted from the wastewater treatment system. Due to the reduced amount of oxidized solids to be removed from the system, a final clarifier, such as the clarifier 140, may be reduced in size, in some embodiments by about 50%. Because a lower amount of BOD enters the biological treatment unit (for example, the biological treatment unit 130), the size of the biological treatment unit may be reduced, in some embodiments by about 30%. There is also a lesser requirement for oxygen in the biological treatment unit which allows for the capacity and power requirements of an aeration system in the biological treatment unit to also be reduced, in some embodiments by about 30%. The reduced size of the components of the treatment system provides for a decreased footprint of the system. For example, a wastewater treatment plant with a capacity to treat 35 million gallons per day (MGD) of wastewater with an influent BOD of 200 mg/L would require about 150,000 $ft^2$ of treatment units with a conventional design approach; with embodiments of the present invention the footprint could be reduced to about 75,000 $ft^2$.

In other embodiments of systems and methods in accordance with the present invention, a wastewater treatment system, such as any of those described above, may further include an anaerobic treatment unit (an anaerobic digester). Non-limiting examples of components or portions of anaerobic systems that can be utilized in one or more configurations of the wastewater treatment systems include, but are not limited to, the DYSTOR® digester gas holder system, the CROWN® disintegration system, the PEARTH® digester gas mixing system, the PFT® spiral guided digester gas holder, the PFT® vertical guided digester holder, the DUO-DECK™ floating digester cover, and the PFT® heater and heat exchanger system, from Evoqua Water Technologies.

The anaerobic digester may be utilized to treat mixed liquor, which may include suspended solids, sludge, and/or solids-rich or solids-lean fluid streams, from one or more other treatment units of the wastewater treatment system. At least a portion of an anaerobically treated sludge produced in the anaerobic digester may be recycled back to one or more other treatment units of the wastewater treatment system. The nature and function of the anaerobic digester and associated recycle streams may be similar to those described in co-owned U.S. Pat. No. 8,894,856, titled "HYBRID AEROBIC AND ANAEROBIC WASTEWATER AND SLUDGE TREATMENT SYSTEMS AND METHODS," which is herein incorporated by reference in its entirety for all purposes.

The systems and components of embodiments of the invention may provide cost advantages relative to other wastewater treatment systems through the use of biological treatment processes in combination with anaerobic digestion. The wastewater treatment systems and processes of embodiments of the present invention can reduce sludge production through the use of various unit operations including aerobic and anaerobic biological processes and recycle streams. The wastewater treatment processes also overcome some of the technical difficulties associated with use of some anaerobic wastewater treatment processes, by, for example, concentrating or strengthening the sludge introduced into the anaerobic digester. Additionally, costs associated with use of a conventional aerobic stabilization unit are typically reduced because less aeration would typically be required in the aerobic processes due to the use of the anaerobic digester and various recycle streams. The various processes can also generate methane as a product of the anaerobic digestion process, which can be used as an energy source. In certain embodiments, a large portion of the chemical oxygen demand (COD) and BOD present in influent wastewater to be treated can be reduced using the anaerobic digester. This can reduce the aeration and oxygen requirements, and thus, operation costs of the wastewater treatment system, and increase the amount of methane produced that can be used as an energy source. Additionally, because anaerobic digestion can be used to reduce COD and BOD in the sludge, the sludge yield can also be reduced. The reduction of COD and/or BOD in the anaerobic treatment unit may also provide for a reduction in size of the stabilization tank or other aerobic treatment unit in the wastewater treatment system as compared to systems not utilizing the anaerobic digester.

Figure 4:
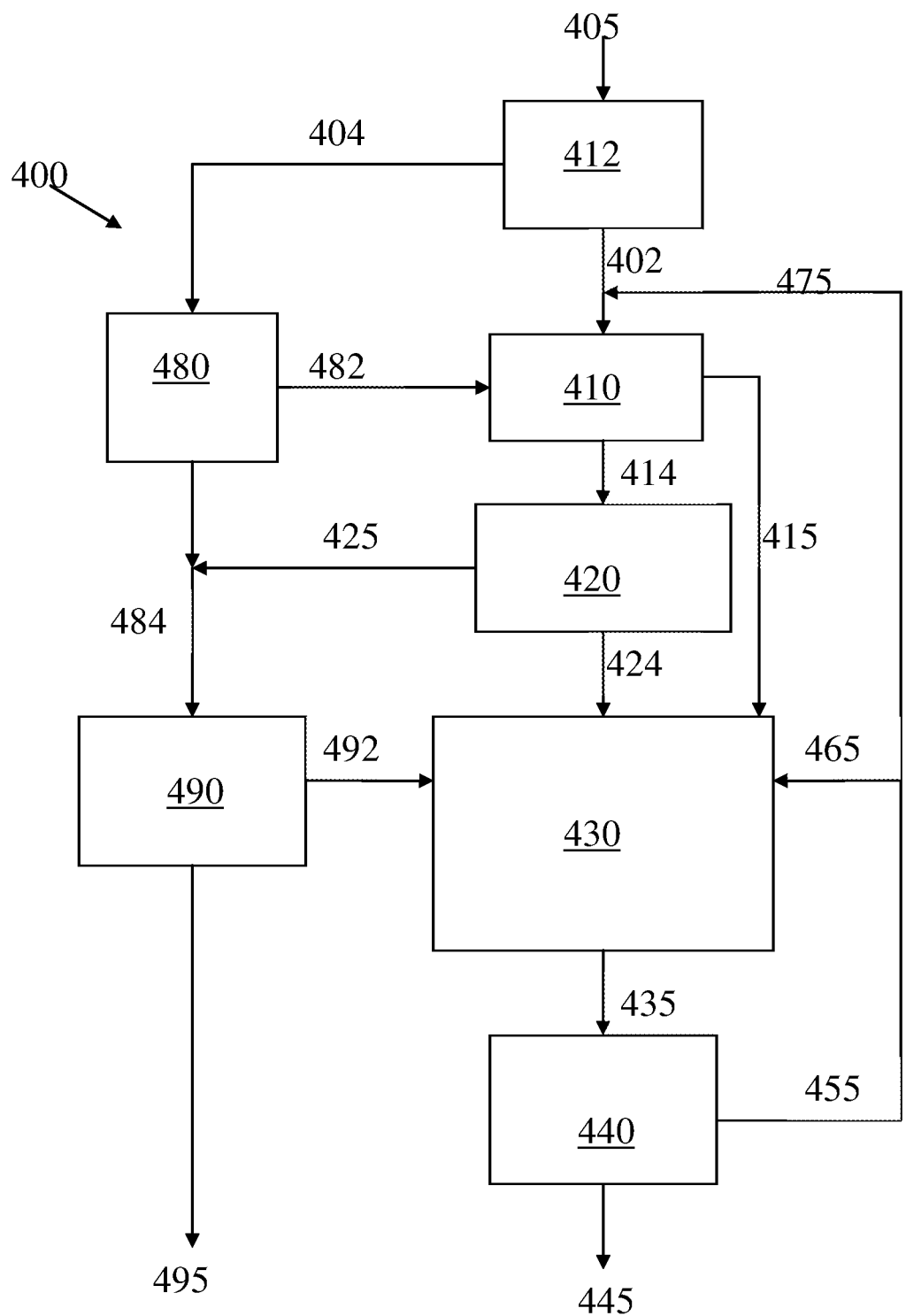
FIG. 4 is a block flow diagram of a wastewater treatment system in accordance with another embodiment of the present invention.

A wastewater treatment system, indicated generally at 400 in FIG. 4, includes an anaerobic treatment unit 490, referred to herein as an anaerobic digester. The wastewater treatment system of FIG. 4 includes a contact tank 410, a DAF unit 420, a stabilization tank 430, a clarifier 440, and associated fluid conduits 414, 424, 435, 445, 455, 465, and 475 which are similar in structure and function to the contact tank 110, DAF unit 120, biological treatment unit 130, clarifier 140, and associated fluid conduits 114, 124, 135, 145, 155, 165, and 175 of the system illustrated in FIG. 1 and described above. A singular DAF unit 420 is illustrated in FIG. 4, although in alternate embodiments the treatment system may use multiple DAF units as described above with reference to the treatment system of FIG. 1.

In the system of FIG. 4, wastewater from a source of wastewater 405 is directed into a primary clarifier 412 through an inlet of the primary clarifier. A solids-rich fluid stream from the clarifier is directed through conduit 404 into an inlet of a thickener 480, which may comprise, for example, a gravity belt thickener. A solids-lean effluent from the primary clarifier 412 is directed into an inlet of the contact tank 410 through conduit 402. A solids-rich output stream from the thickener 480 is directed to an inlet of the anaerobic digester 490 through conduit 484. A solids-lean effluent from the thickener is directed to an inlet of the contact tank 410 through conduit 482. The anaerobic digester is also supplied with suspended solids removed from mixed liquor in the DAF unit 420 through conduits 425 and 484.

In some embodiments, a portion of the suspended solids removed from the mixed liquor in the DAF unit 420 may be recycled to the contact tank 410 through conduits 425 and 426 in a similar manner as the recycle of suspended solids removed in the DAF unit(s) 120 to the contact tank 110 described above with reference to FIG. 1.

The solids-rich output stream from the thickener 480 and any suspended solids from the DAF unit 420 introduced into the anaerobic digester 490 are combined and anaerobically digested in the anaerobic digester. The anaerobic digestion process can be operated at temperatures between about 20° C. and about 75° C., depending on the types of bacteria utilized during digestion. For example, use of mesophilic bacteria typically requires operating temperatures of between about 20° C. and about 45° C., while thermophilic bacteria typically require operating temperatures of between about 50° C. and about 75° C. In certain embodiments, the operating temperature may be between about 25° C. and about 35° C. to promote mesophilic activity rather than thermophilic activity. Depending on the other operating parameters, the retention time in the anaerobic digester can be between about seven and about 50 days retention time, and in some embodiments, between about 15 and about 30 days retention time. In certain embodiments, anaerobic digestion of mixed liquor in the anaerobic digester may result in a reduction in oxygen demand of the mixed liquor of about 50%.

A first portion of an anaerobically digested sludge produced in the anaerobic digester may be recycled through an outlet of the anaerobic digester and into the stabilization tank 430 through conduit 492. This recycle stream may facilitate retaining sufficient solids in the system to provide a desired residence time in the stabilization tank. The anaerobically digested sludge recycled to the stabilization tank may also seed the stabilization tank with nitrification bacteria to enhance the nitrification activity within the stabilization tank as described above. The anaerobically digested sludge recycled into the stabilization tank may also contain methanogenic bacteria which are subsequently returned to the anaerobic digester to enhance the performance of the anaerobic digester as described above.

In embodiments where the stabilization tank 430 includes an aerated anoxic region and an aerobic region, such as in the biological treatment unit 130 of FIG. 2 described above, the portion of the anaerobically digested sludge recycled to the stabilization tank may be directed into the aerated anoxic region of the stabilization tank. A second portion of the anaerobically digested sludge produced in the anaerobic digester may be sent out of the system as waste solids through a conduit 495. The first portion of the anaerobically digested sludge recycled into the stabilization tank 430 may be any amount between about 0% and about 100% of the anaerobically digested sludge produced in and output from the anaerobic digester, with the second portion, making up the balance, sent out of the system as waste solids through conduit 495. In some embodiments, between about 0% and about 80% of the anaerobically digested sludge is recycled from one or more outlets of the anaerobic digester to one or more other unit operations of the treatment system.

Figure 5:
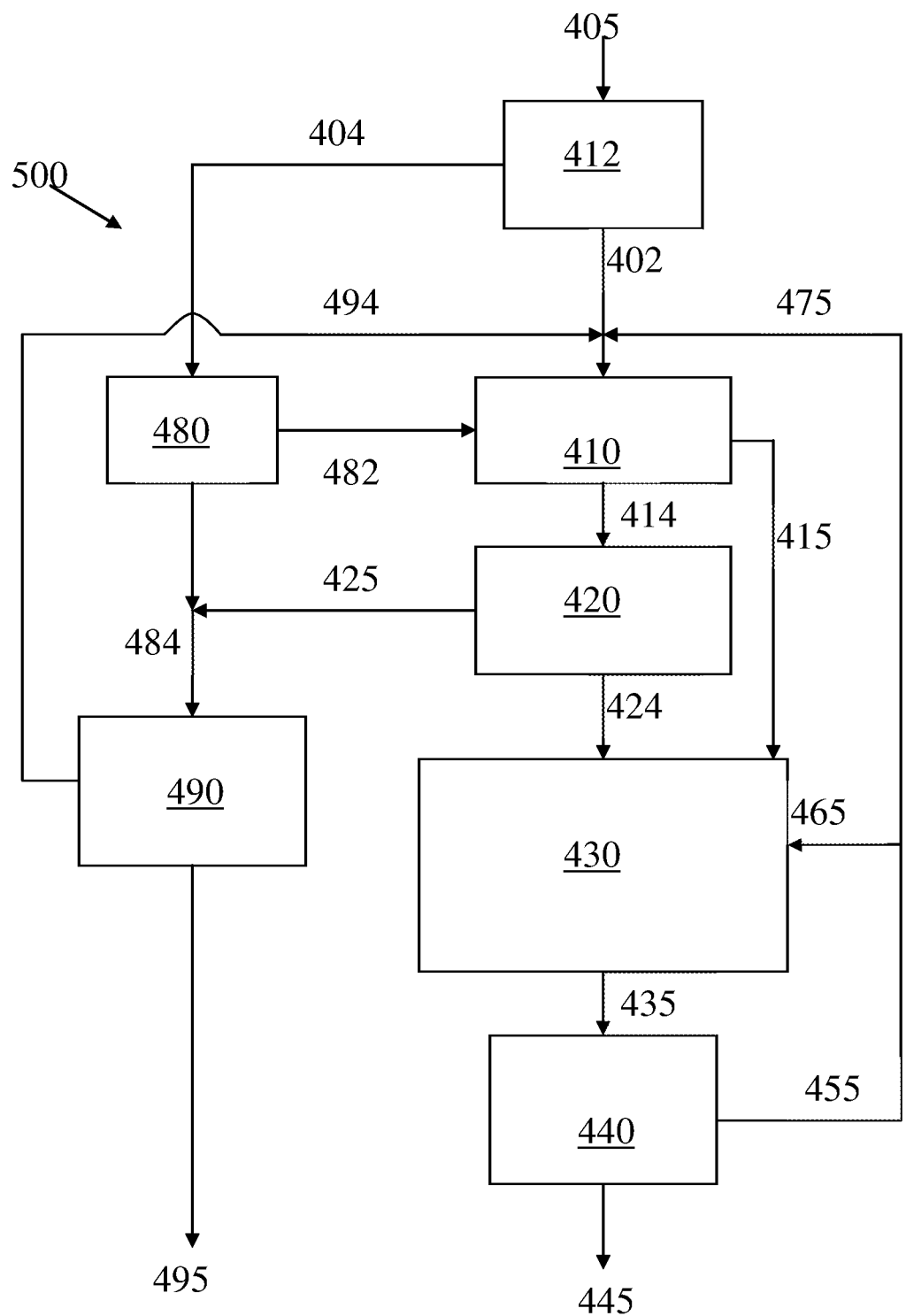
FIG. 5 is a block flow diagram of a wastewater treatment system in accordance with another embodiment of the present invention.

In another embodiment of the wastewater treatment system, indicated generally at 500 in FIG. 5, the first portion of the anaerobically digested sludge produced in the anaerobic digester is recycled through an outlet of the anaerobic digester and into the inlet of the contact tank 410 through conduit 494, rather than into the stabilization tank 430. This recycle stream may facilitate providing sufficient activated sludge in the contact tank to absorb/absorb or enmesh BOD present in the influent wastewater. The anaerobically digested sludge recycled to the contact tank may also seed the contact tank with nitrification bacteria to enhance the nitrification activity within the contact tank as described above. The anaerobically digested sludge recycled into the contact tank may also contain methanogenic bacteria which are subsequently returned to the anaerobic digester to enhance the performance of the anaerobic digester as described above. The first portion of the anaerobically digested sludge recycled into the contact tank 410 may be any amount between about 0% and about 100% of the anaerobically digested sludge produced in and output from the anaerobic digester, with a second portion, making up the balance, sent out of the system as waste solids through conduit 495.

Figure 6:
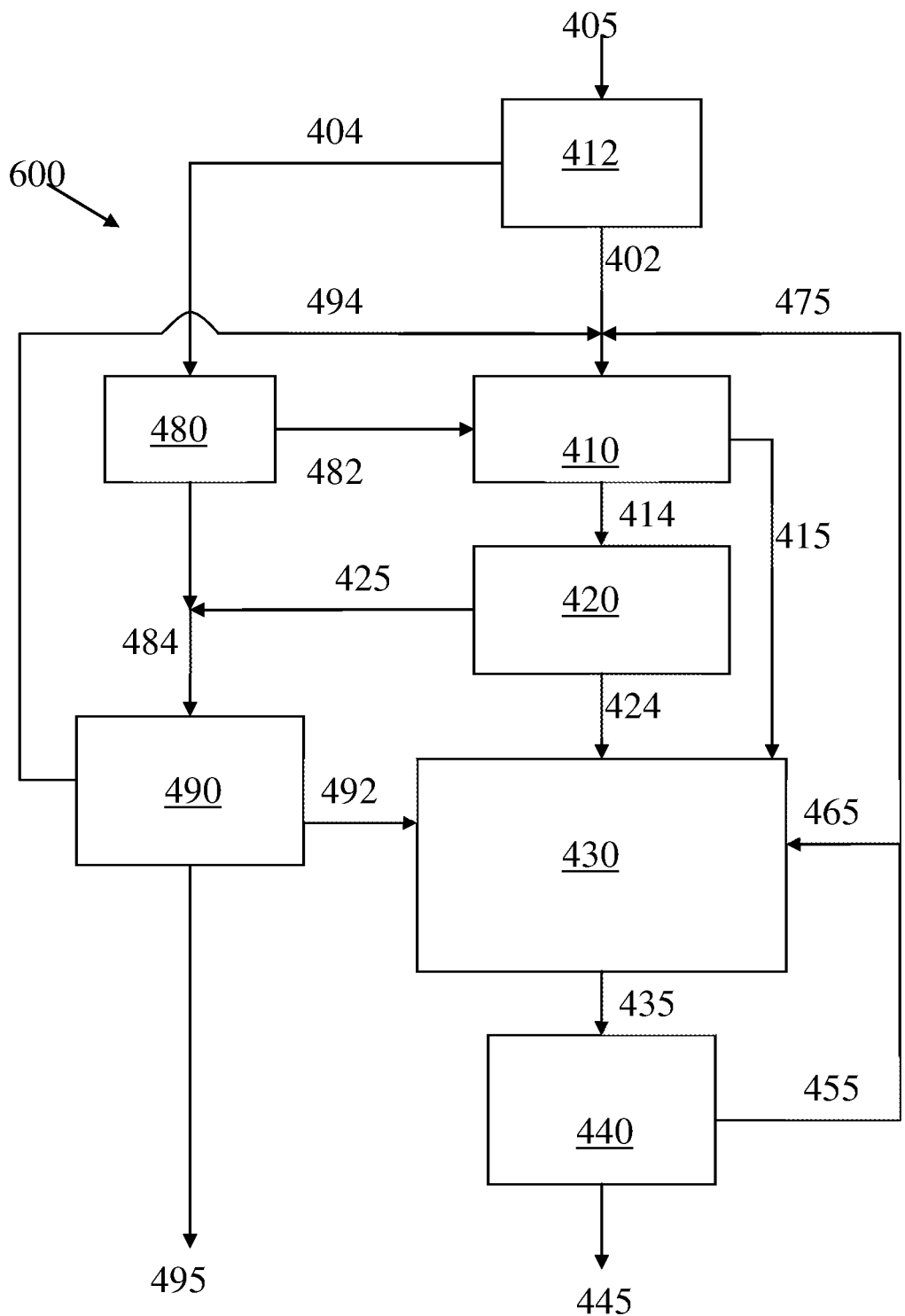
FIG. 6 is a block flow diagram of a wastewater treatment system in accordance with another embodiment of the present invention.

In another embodiment of the wastewater treatment system, indicated generally at 600 in FIG. 6, a first portion of the anaerobically digested sludge produced in the anaerobic digester may be recycled through an outlet of the anaerobic digester and into the inlet of the contact tank 410 through conduit 494, and a second portion of the anaerobically digested sludge may be recycled through an outlet of the anaerobic digester and into the stabilization tank 430 through conduit 492. These recycle streams may provide the benefits described above with regard to systems 400 and 500. A third portion of the anaerobically digested sludge may be directed to waste through conduit 495. The sum of the first portion of the anaerobically digested sludge and the second portion of the anaerobic sludge may be any amount between about 0% and about 100% of the anaerobically digested sludge produced in and output from the anaerobic digester, with the third portion, making up the balance, sent out of the system as waste solids through conduit 495. The recycled anaerobic sludge may be split in any desired ratio between the first portion and the second portion. The first portion may comprise from about 0% to about 100% of all the anaerobically digested sludge produced in and output from the anaerobic digester with the sum of the second portion and the third portion making up the balance.

Figure 7:
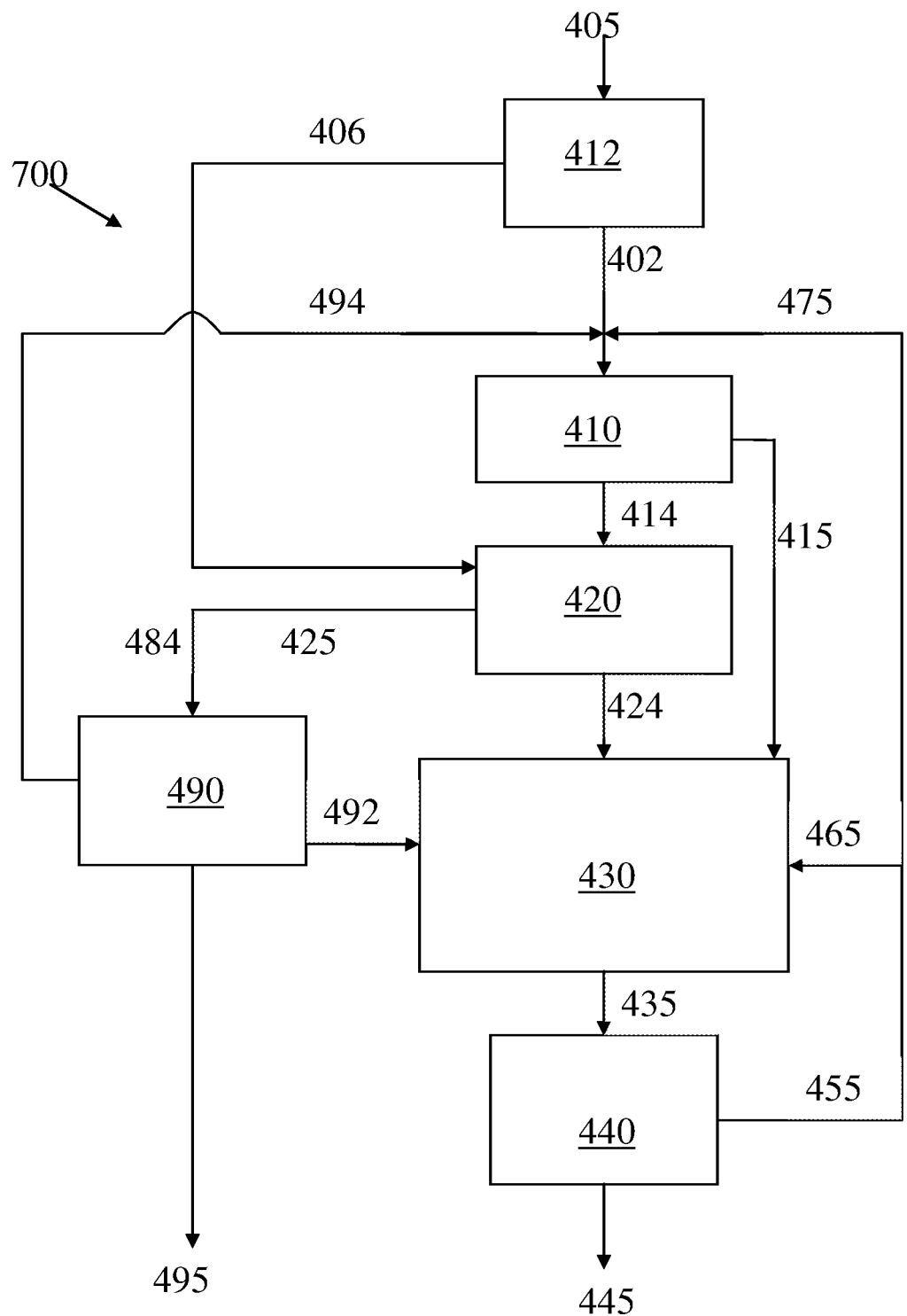
FIG. 7 is a block flow diagram of a wastewater treatment system in accordance with another embodiment of the present invention.

Another embodiment of the wastewater treatment system, indicated generally at 700 in FIG. 7, is similar to that illustrated in FIG. 6, however the thickener 480 is not utilized. Rather, the solids-rich fluid stream from the clarifier is directed through conduit 406 into an inlet of the DAF unit 420. The DAF unit 420 of the system illustrated in FIG. 7 performs the function of the thickener 480 of the system illustrated in FIG. 6. The utilization of the DAF unit 420 to perform the function of the thickener may reduce or eliminate the need for a thickener in the system, which may reduce both capital and operational costs of the system. A first portion of the anaerobically digested sludge created in the anaerobic digester 490 is recycled to the contact tank 410 and a second portion is recycled to the stabilization tank 430 to provide the benefits described above. A third portion of the anaerobically digested sludge is directed to waste through conduit 495.

Figure 8:
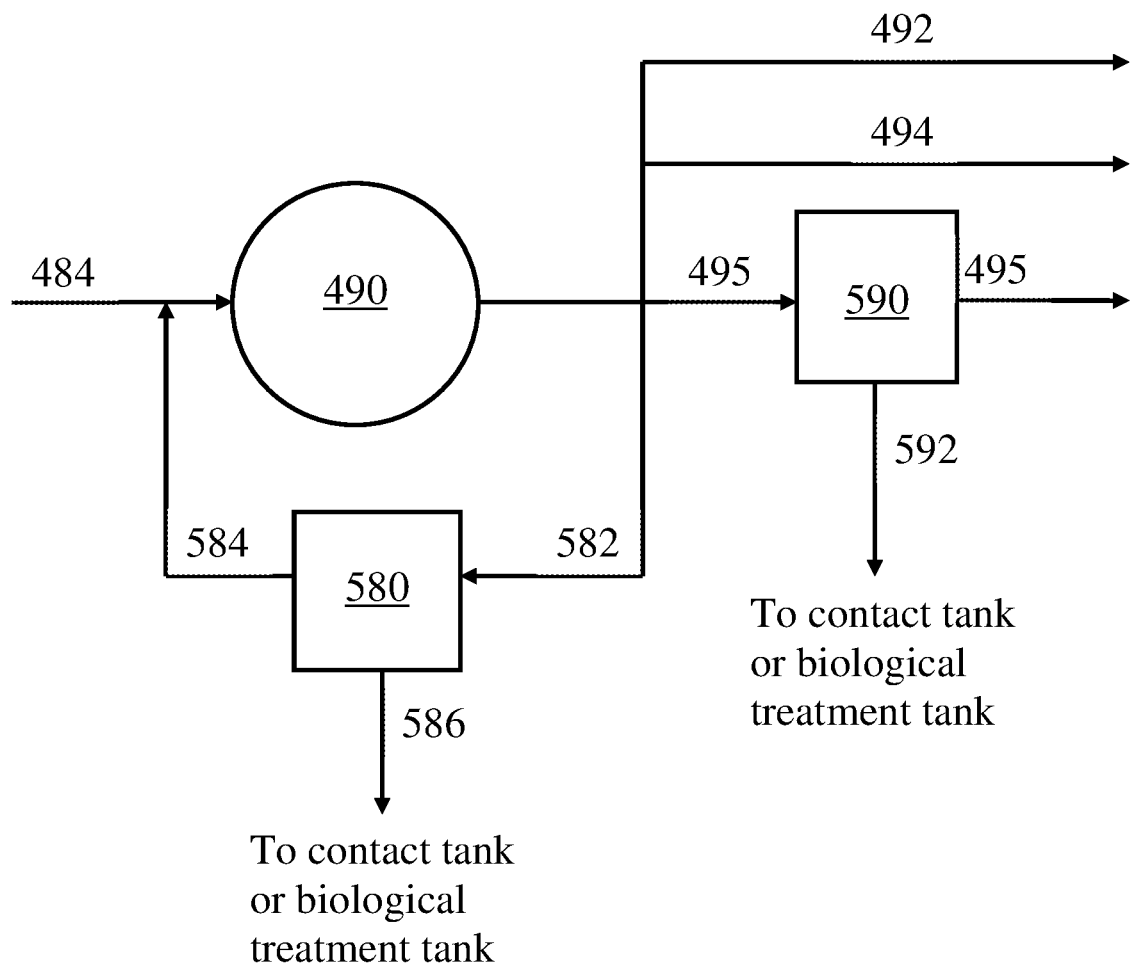
FIG. 8 is a block flow diagram of an embodiment of a recuperative digestion system utilized in embodiments of wastewater treatment systems disclosed herein.

In any of the embodiments disclosed above in which an anaerobic digester 490 is used, the anaerobic digester 490 may be operated as a recuperative digester. Recuperative anaerobic digestion thickens and recirculates a large portion of the digested solids and the extracted liquid output from an anaerobic digester, resulting in a longer solids retention time (SRT) of material in the digester which substantially improves digestion performance. Alternatively, the thickening and recirculating of the solids can substantially reduce the volume requirements of the anaerobic digester. As illustrated in FIG. 8, the anaerobic digester 490 may receive a solids-rich stream through conduit 484 from thickener 480 and/or DAF unit 420 as illustrated in FIGS. 4-7 and may output portions of generated digested solids through conduits 492 and/or 494 to the stabilization or biological treatment tank 430 (FIGS. 4, 6, 7) and/or contact tank 410 (FIGS. 5, 6, 7) and a portion of generated digested solids to waste or downstream treatment through conduit 495. To provide for a recuperative digestion process, the anaerobic digester 490 may be operated in parallel with a thickener 580, for example, a gravity belt thickener. Thickener 580 may alternatively include a screw press, DAF thickener, centrifuge, plate and frame press, or other form of thickener known in the art.

A portion of the digested solids stream output from the anaerobic digester 490, for example, between about 25% and about 75% or about 50% of the digested solids stream output from the anaerobic digester 490 is sent to the thickener 580 through conduit 582. The thickener 580 is able to increase the solids content of the portion of the digested solids stream sent to the gravity belt thickener 580 from, for example, about 4% solids to about 8% solids. The thickened digested solids output from the thickener 580 are returned to the conduit 484 or to an input of the anaerobic digester 490 through conduit 584. Filtrate generated in the gravity belt thickener 580, having a flow rate or volume of, for example, about 50% of that of the portion of the digested solids stream output from the anaerobic digester 490 and sent to the gravity belt thickener 580, may be output as filtrate through conduit 586 and may be recycled upstream to the contact tank 410 or into the stabilization or biological treatment tank 430.

In some embodiments, the volume of the waste digested solids stream exiting the system through conduit 495 may be reduced by treating the waste digested solids stream with another thickener 590, for example, belt press 590 illustrated in FIG. 8. Thickener 590 may alternatively include a screw press, DAF thickener, centrifuge, plate and frame press, or other form of thickener known in the art. Belt press 590 is illustrated as inline in conduit 495. Belt press 590 may increase the solids concentration of the waste digested solids stream from the digester 490 from, for example, about 4% to about 22%. Solids-lean liquid removed from the waste digested solids stream in belt press 590 may be recycled upstream to the contact tank 410 or into the stabilization or biological treatment tank 430.

Further embodiments may include any combination of features of the systems described above. For example, in some embodiments, a first portion of the solids-rich fluid stream from the clarifier is directed through conduit 406 into an inlet of the DAF unit 420, while a second portion is directed into a thickener 480. In any of the above embodiments, the stabilization tank 430 may include an aerated anoxic region and an aerobic region. A first portion of the anaerobically digested sludge recycled to the stabilization tank may be directed into the aerated anoxic region of the stabilization tank and a second portion may be recycled to the aerobic region. The ratio the amount of recycled anaerobic sludge directed to the aerated anoxic region to the amount of recycled anaerobic sludge directed to the aerobic region may be any ratio desired. In some embodiments, the contact tank may be replaced with one or more vertical loop reactors. Any of the above embodiments may include multiples of any of the treatment units and/or conduits illustrated.

EXAMPLES

Prophetic Example 1

Figure 9:
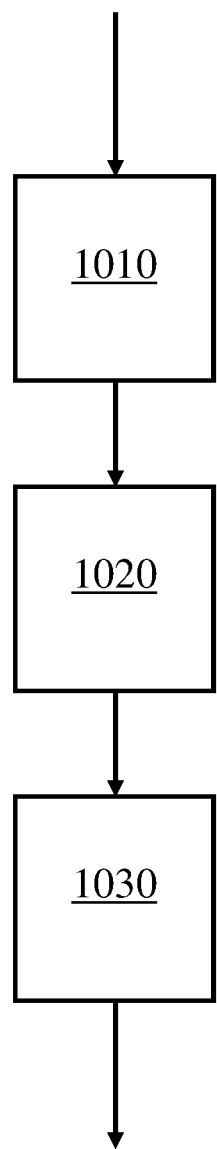
FIG. 9 is a block flow diagram of a comparative example of a wastewater treatment.

A wastewater system including a conventional activated sludge process 1010 and dissolved air flotation unit 1020, and an anaerobic digester 1030 using recuperative digestion is illustrated in FIG. 9. Wastewater with 4% solids and 1 MGD (million gallons/day) enter the digester 1030. The solids concentration leaving is 2.5% and 1 MGD. To maintain a 4% solids concentration in the digester with recuperative thickening, 375,000 gallons of liquid could be removed. For a 20 day SRT, the digester volume could be reduced from 20 million gallons to 12.5 million gallons.

Prophetic Example 2

Figure 10:
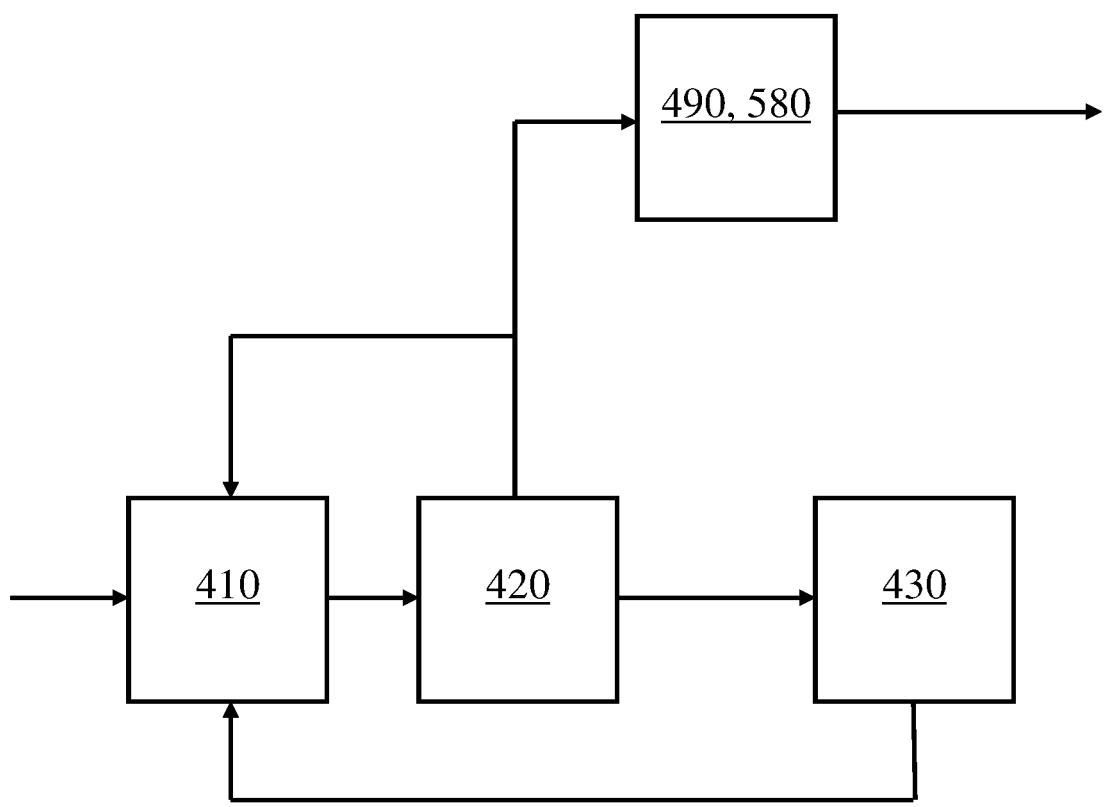
FIG. 10 is a block flow diagram of a wastewater treatment system in accordance with an embodiment of the present invention.

A wastewater system including a contact tank 410, dissolved air flotation unit 420, biological treatment unit 430, and anaerobic digester 490 including a thickener 580 for providing recuperative digestion is illustrated in FIG. 10. Biologically treated activated sludge is recycled from the biological treatment 430 to the contact tank 410. A portion of floated solids removed from mixed liquor from the contact tank 410 in the dissolved air flotation unit 420 is recycled to the contact tank 410. A second portion of floated solids removed from mixed liquor from the contact tank 410 in the dissolved air flotation unit 420 is sent to the anaerobic digester 490. The floated solids stream entering the digester includes 4% solids at a flow of 1 MGD. The solids concentration in the digested solids stream leaving the digester 490 leaving includes 1.5% solids and the flow is 1 MGD. To maintain a 4% solids concentration in the digester with recuperative thickening, 625,000 gallons of liquid could be removed by the thickener 580. For a 20 day SRT, the digester volume could be reduced from 20 million gallons to 7.5 million gallons.

Although recuperative digestion reduces the digester volume in both Example 1 and Example 2, with the process flow in Example 2, the anaerobic digester is 40% smaller in size (12.5 million gallons vs. 7.5 million gallons). Considering capital costs for anaerobic digesters (tank and equipment) are approximately $1 M for 1 million gallons of tank volume, the design of Example 2 would save $5 M in capital costs as compared to the design of Example 1. Table 1 below shows the advantages of utilizing the process flow of Example 2 v. that of Example 1. The combination of a contact tank and dissolved air flotation with recuperative digestion results in increased water recovery, increased BOD removal and a net energy gain compared to recuperative digestion alone.

TABLE 1

| Parameter | System operated with recuperative digestion (Prophetic Example 5) | System operated with contact tank, DAF, and recuperative digestion (Prophetic Example 6) |
| --- | --- | --- |
| BOD treated in biological treatment tank (lbs/day) | 45,000 (20,412 kg/day) | 20,000 (9,072 kg/day) |
| BOD Removal | 0% | 56% |
| Aeration energy (both contact tank and biological treatment tank, kW) | 750 | 400 |
| Solids to anaerobic digester (lbs/day) | 27,000 (12,247 kg/day) | 35,000 (15,876 kg/day) |
| Solids destroyed (lbs/day) | 9,000 (4,082 kg/day) | 22,000 (9,979 kg/day) |
| Biogas produced (mcfd/day) | 0.135 (3,823 cubic meters/day) | 0.330 (9,345 cubic meters/day) |
| Biogas energy (assuming 40% conversion efficiency, kW) | 390 | 950 |
| Net energy gain (kW) | −360 | 550 |

These results show that providing a wastewater treatment system as configured in FIG. 10 with a recycle of solids removed in a DAF unit to a contact tank can significantly reduce the energy required to operate the system as compared to an equivalent system without the recycle of solids from the DAF unit to the contact tank as illustrated in FIG. 9. Adding the DAF to contact tank solids recycle results in less BOD being sent for treatment in the biological treatment tank (a reduction of (45,000−20,000)/45,000=56% in the present example) which lowers the need for aeration in the biological contact tank. A greater amount of biogas (0.330−0.135)/0.135=144% more in the present example) is produced when adding the DAF to contact tank solids recycle to the system. The combined gain in biogas production and decrease in aeration energy requirements results in a net energy gain of 550−(−360)=910 kW when adding the DAF to contact tank solids recycle to the system. At an estimated 0.10/kW energy cost, this net energy gain would yield a cost savings of about $800,000 per year.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A wastewater treatment system comprising:
 a contact tank having a first inlet configured to receive wastewater to be treated, a second inlet configured to receive activated sludge, and an outlet, the contact tank being configured to mix the wastewater to be treated with the activated sludge to form a first mixed liquor;
 a dissolved aft flotation unit having an inlet in fluid communication with the outlet of the contact tank, the dissolved air flotation unit being configured to separate suspended matter from a portion of the first mixed liquor to form a solids-lean dissolved air flotation unit effluent and floated solids, to output the floated solids through a solids outlet of the dissolved aft flotation unit, and to output the solids-lean dissolved aft flotation unit effluent through an effluent outlet of the dissolved air flotation unit;
 a biological treatment unit having a first inlet in fluid communication with the effluent outlet of the dissolved air flotation unit and an outlet, the biological treatment unit being configured to biologically break down organic components of the effluent from the dissolved aft flotation unit to form a second mixed liquor;
 a dissolved aft flotation unit effluent conduit extending between the effluent outlet of the dissolved aft flotation unit and the first inlet of the biological treatment unit;
 an anaerobic digester having an inlet and an outlet;
 a floated solids conduit providing fluid communication between the solids outlet of the dissolved aft flotation unit and the inlet of the anaerobic digester;
 a thickener having an inlet in fluid communication with the outlet of the anaerobic digester, a first outlet in fluid communication with the inlet of the anaerobic digester, and a second outlet, the thickener being configured to receive a portion of a digested solids stream from the outlet of the anaerobic digester, remove liquid from the portion of the digested solids stream to produce a thickened digested solids stream having an increased solids content relative to that of the portion of the digested solids stream, output the removed liquid from the second outlet, and return the thickened digested solids stream to the inlet of the anaerobic digester; and
 a second thickener having an inlet in fluid communication with the outlet of the anaerobic digester downstream of the thickener, the second thickener configured to receive a second portion of the digested solids stream from the outlet of the anaerobic digester and to remove liquid from the second portion of the digested solids stream to produce a dewatered digested solids stream having an increased solids content relative to that of the second portion of the digested solids stream.

2. The system of claim 1, wherein the thickener is a gravity belt thickener.

3. The system of claim 1, configured to direct a majority of the digested solids stream from the outlet of the anaerobic digester to the inlet of the thickener.

4. The system of claim 1, wherein the thickener is configured to produce the thickened digested solids stream with about twice the solids content of the digested solids stream from the outlet of the anaerobic digester.

5. The system of claim 1, wherein the second outlet of the thickener is in fluid communication with an inlet of the contact tank.

6. The system of claim 1, wherein the second outlet of the thickener is in fluid communication with an inlet of the biological treatment unit.

7. The system of claim 1, wherein the second thickener includes a liquid outlet in fluid communication with an inlet of the contact tank.

8. The system of claim 1, wherein the second thickener includes a liquid outlet in fluid communication with an inlet of the biological treatment unit.

9. The system of claim 1, further comprising a clarifier having an inlet in fluid communication with the outlet of the biological treatment unit, an effluent outlet, and a return activated sludge outlet, the clarifier configured to output a clarified effluent through the effluent outlet and a return activated sludge though the return activated sludge outlet.

10. The system of claim 9, further comprising a return activated sludge conduit extending between the return activated sludge outlet of the clarifier and a second inlet of the biological treatment unit.

11. The system of claim 1, further comprising a primary clarifier having an inlet in fluid communication with a source of wastewater, a solids-lean outlet in fluid communication with the inlet of the contact tank and configured to deliver solids-lean wastewater to be treated to the inlet of the contact tank, and a solids-rich outlet in fluid communication with an inlet of a second thickener and configured to deliver a solids-rich liquid stream separated from the solids-lean wastewater to be treated to the inlet of the second thickener.

12. The system of claim 11, wherein the second thickener includes a solids-rich outlet configured to deliver a thickened solid-rich liquid stream to an inlet of the anaerobic digester and a solids-lean outlet configured to deliver liquid separated from the solid-rich liquid stream to a third inlet of the contact tank.

13. A method of treating wastewater comprising:
 introducing the wastewater into a contact tank including an activated sludge;
 mixing the wastewater with activated sludge in the contact tank to form a first mixed liquor;
 directing the first mixed liquor to a dissolved air flotation unit;
 separating the first mixed liquor in the dissolved air flotation unit to form a solids-lean dissolved air flotation unit effluent and floated solids;

directing the solids-lean dissolved air flotation unit effluent to a biological treatment unit;

biologically treating the solids-lean dissolved air flotation unit effluent in the biological treatment unit to form a biologically treated mixed liquor;

directing the floated solids to an anaerobic digester;

biologically treating the floated solids in the anaerobic digester to form digested solids;

directing a portion of the digested solids to a thickener;

separating liquid from the digested solids in the thickener to form thickened digested solids;

recycling the thickened digested solids to the anaerobic digester; and directing a second portion of the digested solids to a second thickener in fluid communication downstream of the anaerobic digester and thickener.

14. The method of claim 13, further comprising directing the liquid separated from the digested solids in the thickener to the contact tank.

15. The method of claim 13, further comprising directing the liquid separated from the digested solids in the thickener to the biological treatment unit.

16. The method of claim 13, wherein directing the portion of the digested solids to the thickener comprises directing a majority of the digested solids formed in the anaerobic digester to the thickener.

17. The method of claim 13, wherein separating liquid from the digested solids in the thickener comprises increasing a solids content of the digested solids by about two times in the thickener to form the thickened digested solids.

18. The method of claim 13, further comprising dewatering the second portion of the digested solids in the second thickener.

19. The method of claim 18, further comprising directing liquid separated from the second portion of the digested solids in the second thickener to the contact tank.

20. The method of claim 18, further comprising directing liquid separated from the second portion of the digested solids in the second thickener to the biological treatment unit.

21. The method of claim 13, further comprising:

directing the biologically treated mixed liquor to a clarifier;

separating the biologically treated mixed liquor in the clarifier to form a clarified effluent and a return activated sludge;

recycling a portion of the return activated sludge to the biological treatment unit; and directing the clarified effluent to a treated wastewater outlet.

22. A method of facilitating increased operating efficiency of a wastewater treatment system including a contact tank, a dissolved air flotation unit having an inlet in fluid communication with an outlet of the contact tank, a biological treatment unit in fluid connection with an outlet of the contact tank, and an anaerobic digester including an inlet in fluid communication with a floated solids outlet of the dissolved air flotation unit, the method comprising:

connecting an inlet of a thickener to an outlet of the anaerobic digester;

connecting a thickened digested solids outlet of the thickener to the inlet of the anaerobic digester; and fluidly connecting a second thickener to the outlet of the anaerobic digester downstream of the thickener.

23. The method of claim 22, further comprising connecting a liquids outlet of the thickener to one of the contact tank and the biological treatment unit.

24. The method of claim 22, further comprising connecting a liquids outlet of the second thickener to one of the contact tank and the biological treatment unit.

* * * * *